United States Patent
Okada et al.

(10) Patent No.: US 8,310,740 B2
(45) Date of Patent: Nov. 13, 2012

(54) IMAGE SCANNING DEVICE INCLUDING A COMBINE UNIT WHICH SUPERIMPOSES CONVERSION RESULTS OF A PLURALITY OF PHOTOELECTRIC CONVERTERS

(75) Inventors: Tomohiko Okada, Kyoto (JP); Takao Horiuchi, Nara (JP); Yoshitaka Okahashi, Kashihara (JP); Takeshi Murakami, Kizugawa (JP); Yukihito Nishio, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 572 days.

(21) Appl. No.: 12/185,164

(22) Filed: Aug. 4, 2008

(65) Prior Publication Data
US 2009/0040568 A1    Feb. 12, 2009

(30) Foreign Application Priority Data

Aug. 9, 2007   (JP) ................................ 2007-208627

(51) Int. Cl.
H04N 1/04 (2006.01)
(52) U.S. Cl. ........ 358/497; 358/409; 358/410; 358/448; 358/474; 358/482; 358/483; 358/494; 250/208.1; 257/234
(58) Field of Classification Search ................ 358/3.26, 358/505, 528, 482, 409, 410, 448, 474, 483, 358/486, 494, 497; 250/208.1; 257/234
See application file for complete search history.

(56) References Cited

U.S. PATENT DOCUMENTS

| | | | |
|---|---|---|---|
| 5,550,651 A | 8/1996 | Terajima | |
| 6,160,636 A * | 12/2000 | Nagano et al. | 358/412 |
| 6,972,879 B2 * | 12/2005 | Ide | 358/514 |
| 7,515,768 B2 * | 4/2009 | Nishi et al. | 382/275 |
| 2001/0038457 A1 * | 11/2001 | Moreau et al. | 358/1.2 |
| 2004/0190083 A1 * | 9/2004 | Ikeno et al. | 358/474 |
| 2004/0190087 A1 * | 9/2004 | Ikeno et al. | 358/482 |
| 2004/0263920 A1 | 12/2004 | Kondo et al. | |
| 2005/0063017 A1 * | 3/2005 | Minamino et al. | 358/528 |
| 2007/0058177 A1 * | 3/2007 | Teshima | 358/1.2 |

FOREIGN PATENT DOCUMENTS

| | | |
|---|---|---|
| JP | 5-284283 | 10/1993 |
| JP | 2003-009008 | 1/2003 |
| JP | 2004-208007 | 7/2004 |
| WO | 03/061271 | 7/2003 |

* cited by examiner

*Primary Examiner* — Steven Kau
*Assistant Examiner* — Juan Guillermety
(74) *Attorney, Agent, or Firm* — Renner, Otto, Boisselle & Sklar, LLP

(57) ABSTRACT

An image scanning device includes a CCD pair provided with two rows of photodiode arrays for scanning an image on a paper, a motor drive circuit for causing the CCD pair to sub-scan the image on the paper, and an adder for superimposedly combining two outputs of the CCD pair with a predetermined time lag therebetween. A control unit controls the adder to add the two outputs of the CCD pair without the time lag when received an instruction of a low resolution that corresponds to ½ of a high resolution by a resolution switch and thereby doubles a speed of the sub-scan by the motor drive circuit.

13 Claims, 7 Drawing Sheets

FIG. 4A

CONVEYING DIRECTION OF PAPER ←

FIG. 4B

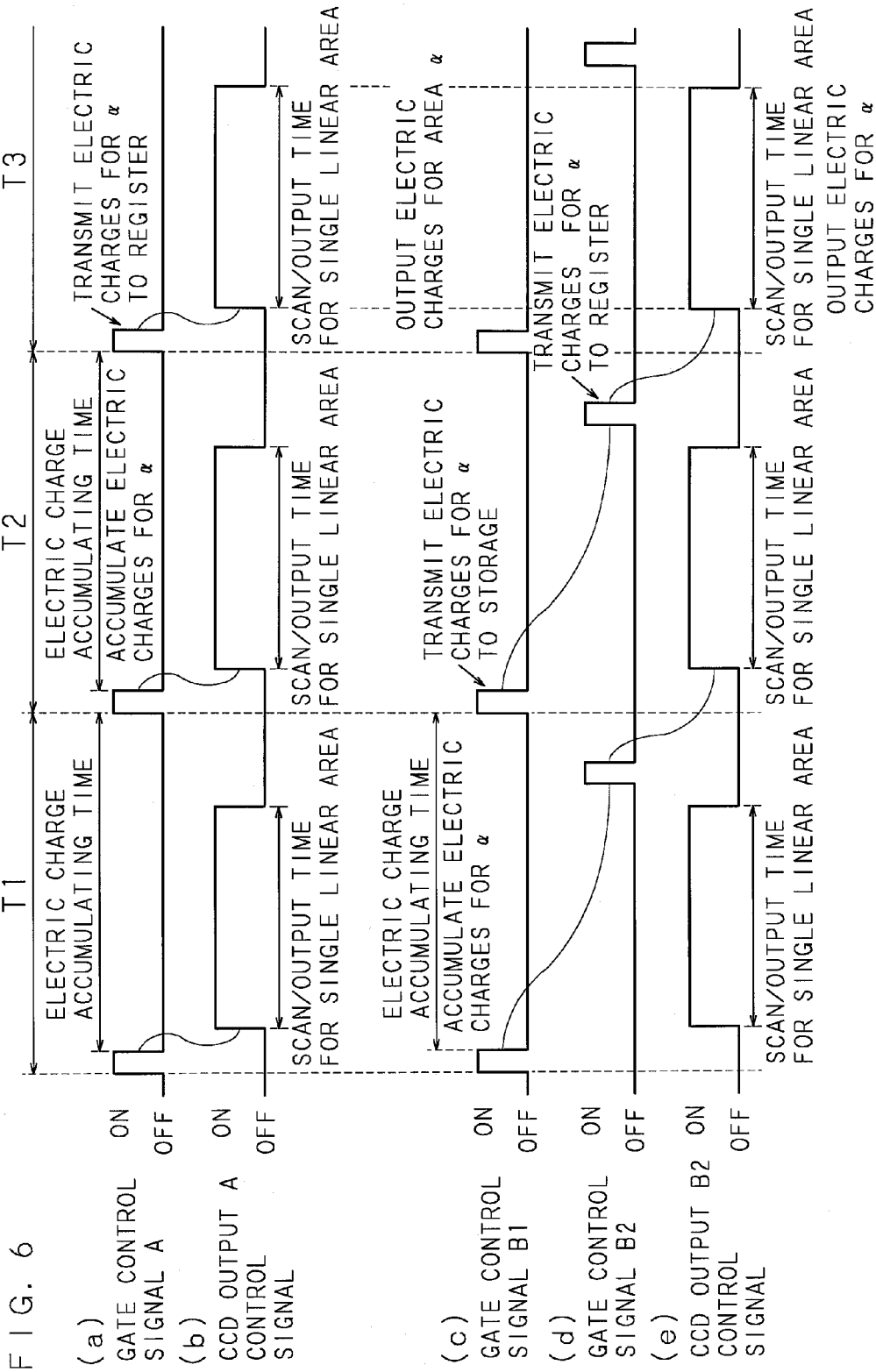

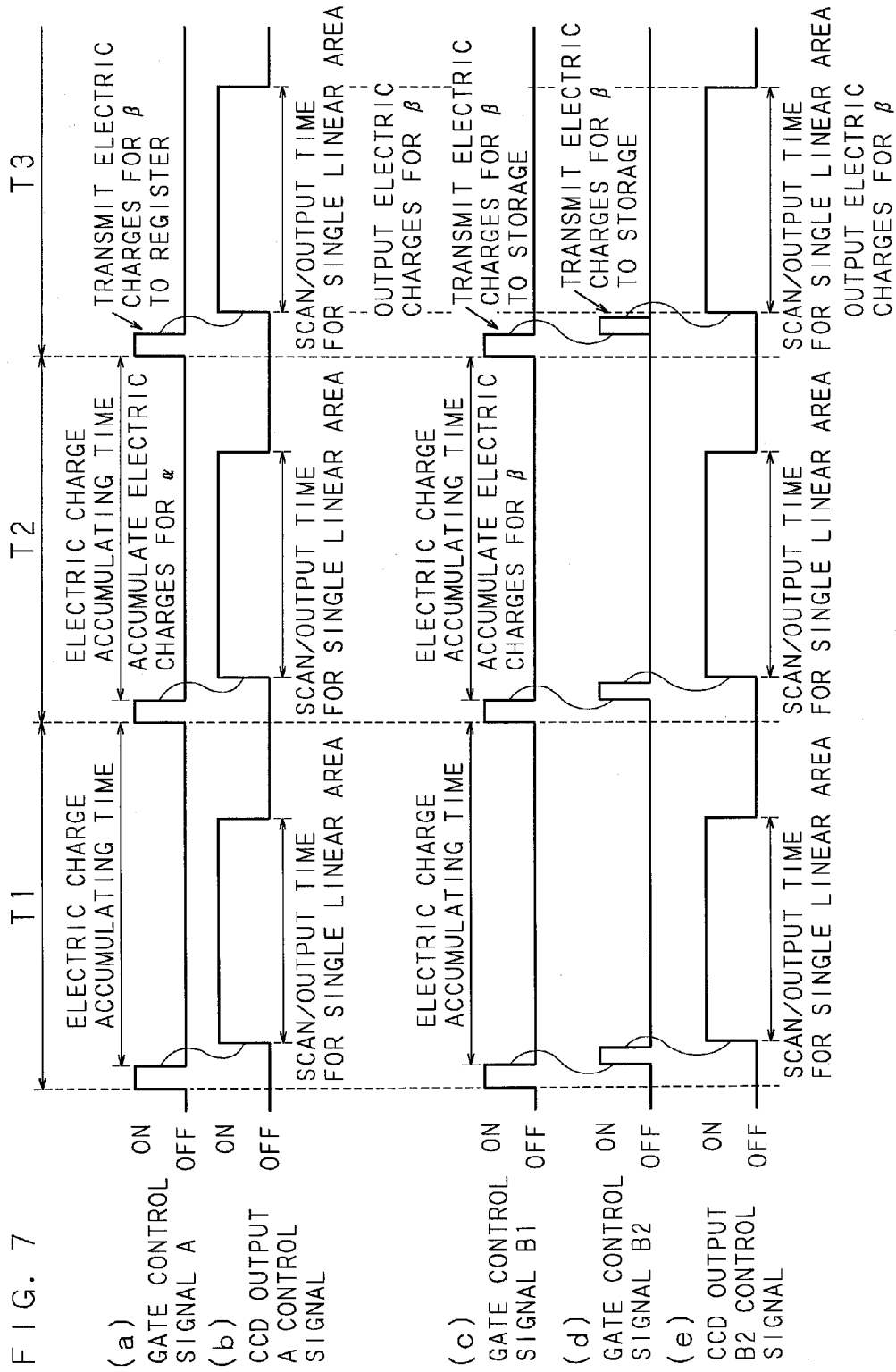

IMAGE SCANNING DEVICE INCLUDING A COMBINE UNIT WHICH SUPERIMPOSES CONVERSION RESULTS OF A PLURALITY OF PHOTOELECTRIC CONVERTERS

CROSS-REFERENCE TO RELATED APPLICATIONS

This Nonprovisional application claims priority under 35 U.S.C. §119(a) on Patent Application No. 2007-208627 filed in Japan on Aug. 9, 2007, the entire contents of which are hereby incorporated by reference.

BACKGROUND

1. Field of the Invention

The present invention relates to an image scanning device that can increase a scanning speed while securing its scanning quality.

2. Description of Related Art

Conventionally, the following method of scanning an image on an original by an image scanning device is widely used. Light is illuminated on an original placed on a flatbed or an original being conveyed by a conveying means. A one-dimensional photoelectric converter (e.g., line sensor) arranged in a direction (i.e., main scanning direction) perpendicular to a sub-scanning direction (i.e., a moving direction of a scanning mechanism or a conveying direction of the original) then receives the light reflected from the original.

As the photoelectric converter, CCDs are generally used. When the CCDs capture an image, electric charges are accumulated, and an electric signal corresponding to the accumulated electric charges are outputted as the scanned signal of the image. For such a scanning device, when a resolution of the scanning is increased or when a speed of the scanning is increased, a product of a light quantity and a capturing period of time of the image captured by the CCDs decreases inevitably. Accordingly, there is a tendency where the accumulated electric charges are reduced and an acquired S/N ratio of the scanned signal is degraded.

In the meantime, a demand of a higher speed and a higher resolution of the scanning process has increased. Therefore, a photoelectric converter with a time delay and integration (hereinafter, referred to as "TDI") scheme may be adopted as a means for scanning an image with a high precision. The photoelectric converter of TDI scheme includes a plurality of one-dimensional photoelectric converters. Each of the photoelectric converters scans the same linear area of an original with a time lag therebetween corresponding to a speed of the sub-scan. The scanned signals of the different photoelectric converters are then combined together, and thereby acquiring doubled scanned signals without reducing the scanning speed while scanning with high precision (for example, refer to WO2003/061271).

SUMMARY

For the TDI scheme, a resolution in the sub-scanning direction is determined with an interval of the linear areas of the original that are scanned by adjacent photoelectric converters. Thus, when the image is scanned with a low resolution where the two adjacent areas are scanned as a single area, the technique of combining the scanned signals cannot be adopted, and the scanned signal of one of the photoelectric converters is used instead. For this reason, for example, when increasing the speed of the sub-scan, a time period during which sufficient electric charges are accumulated by the photoelectric converter cannot be secured, and thereby causing a problem that the scanning quality of the original decreases.

The present invention is made in view of the above conditions, and provides an image scanning device that can prevent deterioration of a scanning quality of an original. Specifically, when increasing a speed of a relative movement of the original in the case of a low scanning resolution, signals of a plurality of photoelectric converters are combined without a time lag to double electric charges used as the scanned signals.

An image scanning device according to a first aspect of the invention comprises a plurality of photoelectric converters coplanarly arranged in parallel with each other, each of the photoelectric converters having photoelectric conversion elements that are linearly arranged for scanning an image on an original, a relative movement control part for controlling relative movement between the photoelectric conversion elements and the original in the parallely-arranged direction of the plurality of photoelectric converters, a combine unit for superimposing the conversion results of the plurality of photoelectric converters with a predetermined time lag therebetween, and a receive unit for receiving a predetermined instruction. The combine unit superimposes the conversion results of the plurality of photoelectric converters without the time lag when the receive unit receives the predetermined instruction. The term "image on original" includes, but not limited to, printed text, handwriting, or an object on a paper, and the paper may be, but not limited to, other form of sheet-shaped article or other sheet-shaped article made of other material.

According to the first aspect of the invention, when the receive unit receives the predetermined instruction, the combine unit superimposes the conversion results of the plurality of photoelectric converters without the time lag. Therefore, when scanning at a low resolution, the electric charges that are conversion results of the plurality of photoelectric converters are superimposed. Therefore, the electric charges used as the scanned signals are doubled and thereby preventing deterioration of the scanning quality of the original.

The image scanning device according to a second aspect of the invention, comprises a plurality of delay units corresponding to the plurality of photoelectric converters, wherein each of the delay units corresponds to each of the photoelectric converters, and a delay time for one of the plurality of delay units is longer than a delay time for the other delay unit with photoelectric converters located more rearward in the relative moving direction with respect to the original than photoelectric converter of said one of the plurality of delay units.

According to the second aspect of the invention, there are a plurality of delay units corresponding to the plurality of photoelectric converters, wherein each of the delay units corresponds to each of the photoelectric converters. A delay time for one of the plurality of delay units is longer than a delay time for the other delay unit with photoelectric converters located more rearward in the relative moving direction with respect to the original than photoelectric converter of said one of the plurality of delay units. Thus, upon superimposing the conversion results of the photoelectric converters by the combine unit, the predetermined time lag may be generated by the delay unit, respectively.

In the image scanning device according to a third aspect of the invention, the plurality of delay units include serially-connected first to Mth delay units. Each of the first to Mth delay units includes a fixed delay unit having a predetermined delay time, and N (N is an integer from 0 to M-1) variable delay units having a delay time that corresponds to a time period during which the original is relatively moved from a photoelectric converter to an adjacent photoelectric converter. The combine unit sets a delay time for the first to Mth delay units to the predetermined delay time when the receive unit receives the predetermined instruction.

According to the third aspect, the plurality of delay units included in the combine unit is the first to Mth delay units, each of which including the fixed delay unit having the predetermined delay time, and the different number of variable delay units (i.e., N delay units), each of which having the delay time corresponding to a single scan time of the photoelectric converter, serially connected to the fixed delay unit. In addition, when the receive unit receives the predetermined instruction, the delay times for the first to Mth delay units are uniformly set to the predetermined delay time. Thus, in the case of scanning at a high resolution, when a relative movement time period between the linear areas to be scanned and a scan time period of a single scanning area are the same, the combine unit superimposes the conversion results of the same area for the photoelectric converters. On the other hand, in the case of scanning at a low resolution, the combine unit combines the conversion results of the photoelectric converters without a time lag, respectively.

In the image scanning device according to a fourth aspect of the invention, the relative movement control part increases a speed of the relative movement more than the case where the predetermined instruction is not received, when the receive unit receives the predetermined instruction.

According to the fourth aspect, when the receive unit receives the predetermined instruction, the speed of the relative movement of the original is increased more than the case where the predetermined instruction is not received. Therefore, in the case of scanning at a low resolution, a speed of the sub-scan is increased more than that of a high resolution to shorten the scan time of the original, for example.

In the image scanning device according to a fifth aspect of the invention, the receive unit receives the predetermined instruction that is related to scanning at a 1/J (J is a natural number greater than two) resolution of the highest resolution, and the relative movement control part increases the speed of relative movement by J times of that of the highest resolution when the receive unit receives the predetermined instruction.

According to the fifth aspect, when the receive unit receives the instruction that is related to scanning at a 1/J resolution of the highest resolution, the speed of the relative movement of the original is increased by J times of that of the highest resolution. Therefore, the scan time of the original is shortened to 1/J of that of the highest resolution.

In the image scanning device according to a sixth aspect of the invention, the plurality of photoelectric converters correspond to colors of RGB, respectively.

According to the sixth aspect of the invention, corresponding to the colors of RGB, the plurality of photoelectric converters are provided, and thereby scanning a color image by the photoelectric converters.

The above and further objects and features of the invention will more fully be apparent from the following detailed description with accompanying drawings.

BRIEF DESCRIPTION OF THE SEVERAL VIES OF THE DRAWINGS

FIGS. 4A and 4B are diagrams showing an operation in which outputs of two CCDs are superimposed with TDI scheme.

FIG. 6 is a timing chart showing a relationship between gate control signals and CCD output control signals outputted from a control unit with TDI scheme.

FIG. 7 is a timing chart showing a relationship between the gate control signals and the CCD output control signals outputted from the control unit when a ½ resolution of the high resolution is specified.

DETAILED DESCRIPTION

Hereafter, the present invention will be explained in full detail based on the drawings illustrating an embodiment of the present invention.

Figure 1:
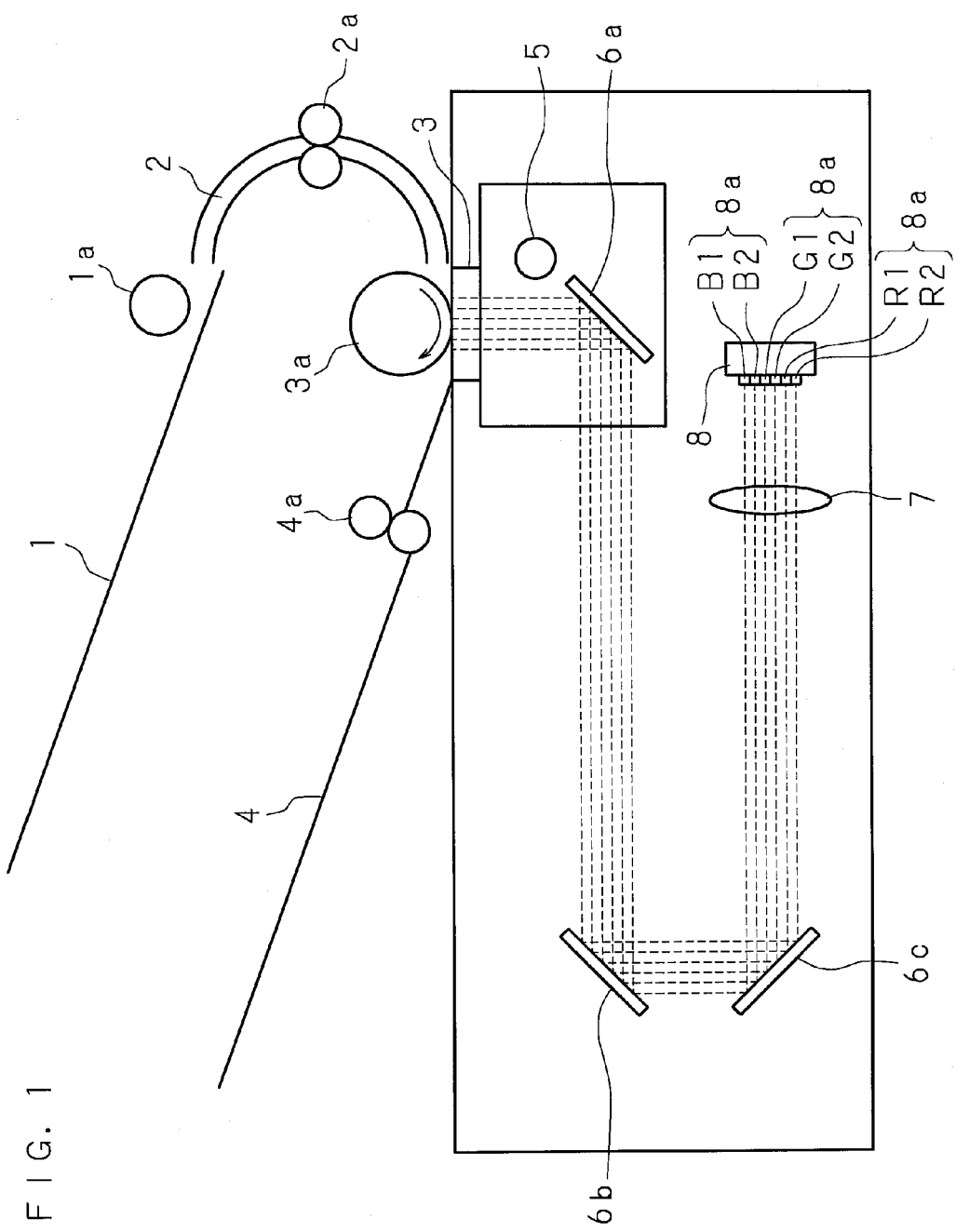
FIG. 1 is a front cross-sectional view schematically showing an image scanning device according to an embodiment of the present invention.

FIG. 1 is a front cross-sectional view schematically showing an image scanning device according to an embodiment of the present invention. In this figure, a reference numeral "1" is a paper tray for placing papers with their faces up. In this embodiment, the paper tray 1 has a width corresponding to the maximum width of the papers to be scanned, and is typically provided above an image scanning device so as to be inclined upwardly from one side (e.g., to the right) to the other side (e.g., to the left). A conveyance path 2 is arranged at a lower end portion of the paper tray 1 for feeding a paper (original) placed on the paper tray 1. The conveyance path 2 is formed with a guide member of a semicircle-arc cross-section in the front view, and is arranged at a lower end portion of the paper tray 1 so that both openings of the conveyance path 2 are located in the vertical direction to each other. The upstream-side opening of the conveyance path 2 is directed toward the paper tray 1 so that it receives a paper conveyed from the paper tray 1. In the middle of the conveyance path 2, conveyance rollers 2a for assisting the conveyance of the paper are arranged.

At the downstream-side opening of the conveyance path 2, a glass plate 3 having approximately the same width as that of the paper tray 1 is horizontally arranged so that it receives the paper conveyed from the conveyance path 2. A platen roller 3a for pressing the paper onto the glass plate 3 is rotatably supported above the glass plate 3. Paper-discharge rollers 4a are arranged downstream from the pressing position by the platen roller 3a in the conveying direction of the paper, and the paper-discharge rollers 4a conveys the paper passed through the above of the glass plate 3 to downstream in the conveying direction. A paper-discharge tray 4 for placing the papers conveyed from the paper-discharge rollers 4a with their faces down is fixed below the paper tray 1 so that it may be in parallel with the paper tray 1.

A straight tubular lamp 5 is horizontally provided below the glass plate 3, and is slightly offset toward the one side (i.e., to the right) from directly below the glass plate 3 so that its longitudinal direction is perpendicular to the conveying direction of the paper. The lamp 5 can illuminates the paper located obliquely upward the lamp. At this point, the paper is made up-side down as passing through the conveyance path 2 and, thus, its image surface (i.e. the paper surface to be scanned) faces downward. A first mirror 6a is provided below the lamp 5 and directly below the glass plate 3 so as to incline its normal line toward the other side (i.e., to the left) at 45 degrees with respect to the upward vertical direction. The first mirror 6a reflects a downward scanned (reflected) light from the paper. A second mirror 6b is arranged on the other side of the first mirror 6a (i.e., to the left) to incline its normal line toward the first mirror 6a at 45 degrees with respect to the downward vertical direction. The second mirror 6b reflects and relays the scanned light reflected at right-angle from the first mirror 6a. Further, the third mirror 6c is arranged below the second mirror 6b to incline its normal line toward the one direction (i.e., to the left) at 45 degrees with respect to from the upward vertical direction. The third mirror 6c reflects the scanned light relayed from the second mirror 6b to the one side (i.e., to the left). A CCD array 8 is arranged below the first mirror 6a for receiving the scanned light. The scanned light reflected from the third mirror 6c is directed to the CCD array 8 along a horizontal light path through a collective lens 7.

The CCD array 8 includes three CCD pairs 8a, each pair consisting of two linear CCDs, corresponding to colors of RGB, respectively. The two CCDs are horizontally arranged and one CCD is located directly above the other CCD. Thus, the six CCDs are parallely arranged in order of B (B1, B2), G (G1, G2), and R (R1, R2) corresponding to each color. Each CCD of the CCD pair 8a includes photodiodes and shift resistors that are linearly arranged (refer to FIG. 3). Thus, an image on the paper formed on the CCD array 8 is scanned in the horizontal direction by the two CCDs for each color of RGB, and the scanned images are converted into electric signals, respectively.

Figure 2:
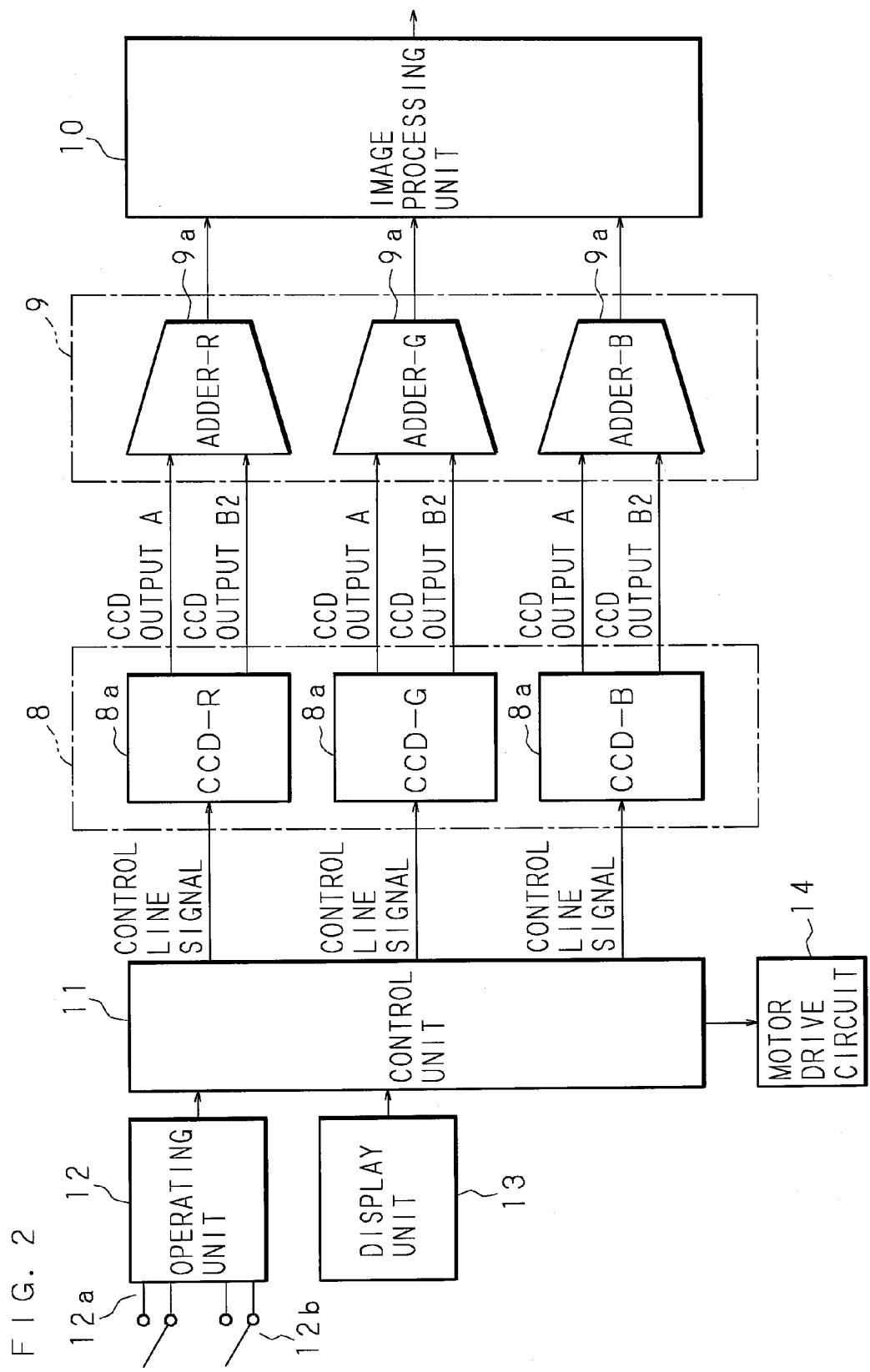
FIG. 2 is a block diagram showing a partial configuration of an image scanning device.

FIG. 2 is a block diagram showing a partial configuration of the image scanning device. As described above, each of the CCD pairs 8a scans an incoming light, and transmits two CCD outputs (e.g., CCD output A and CCD output B2) to a group of adders 9. The group of adders 9 includes three adders 9a corresponding to colors of RGB. Each of the adders 9a adds the CCD outputs (i.e., CCD output A and CCD output B2) inputted from the respective CCD pair 8a, and outputs the addition result to an image processing unit 10. The image processing unit 10 performs image processes, such as A/D conversion, gamma conversion, color correction, or the like, for the addition result inputted from each adder 9a for each color, and outputs the processed result to a known display device (not illustrated).

A control unit 11 includes a ROM storing information, such as a program, a CPU that executes input/output control (s) and calculation(s) according to a control program stored in the ROM in advance, a RAM that stores information generated temporarily, and an input/output interface that performs input and output with an external circuit. To the input/output interface of the control unit 11, an operating unit 12, a display unit 13, a motor drive circuit 14, and control lines to each of the CCD pairs 8a are connected. The control unit 11 outputs gate control signals for controlling transmission between the registers constituting each of the CCD pairs 8a, and output control signals for controlling the outputs of the CCD pair 8a, to the respective control lines (refer to FIG. 3).

The operating unit 12 includes a resolution switch 12a for a user to instruct a scanning resolution of a paper, and a start switch 12b for instructing start of the scan. The display unit 13 displays the contents of instruction and errors. The motor drive circuit 14 controls a driving speed of a drive motor (not illustrated), and the drive motor drives the conveyance rollers 2a, the platen roller 3a, and the paper-discharge rollers 4a.

Figure 3:
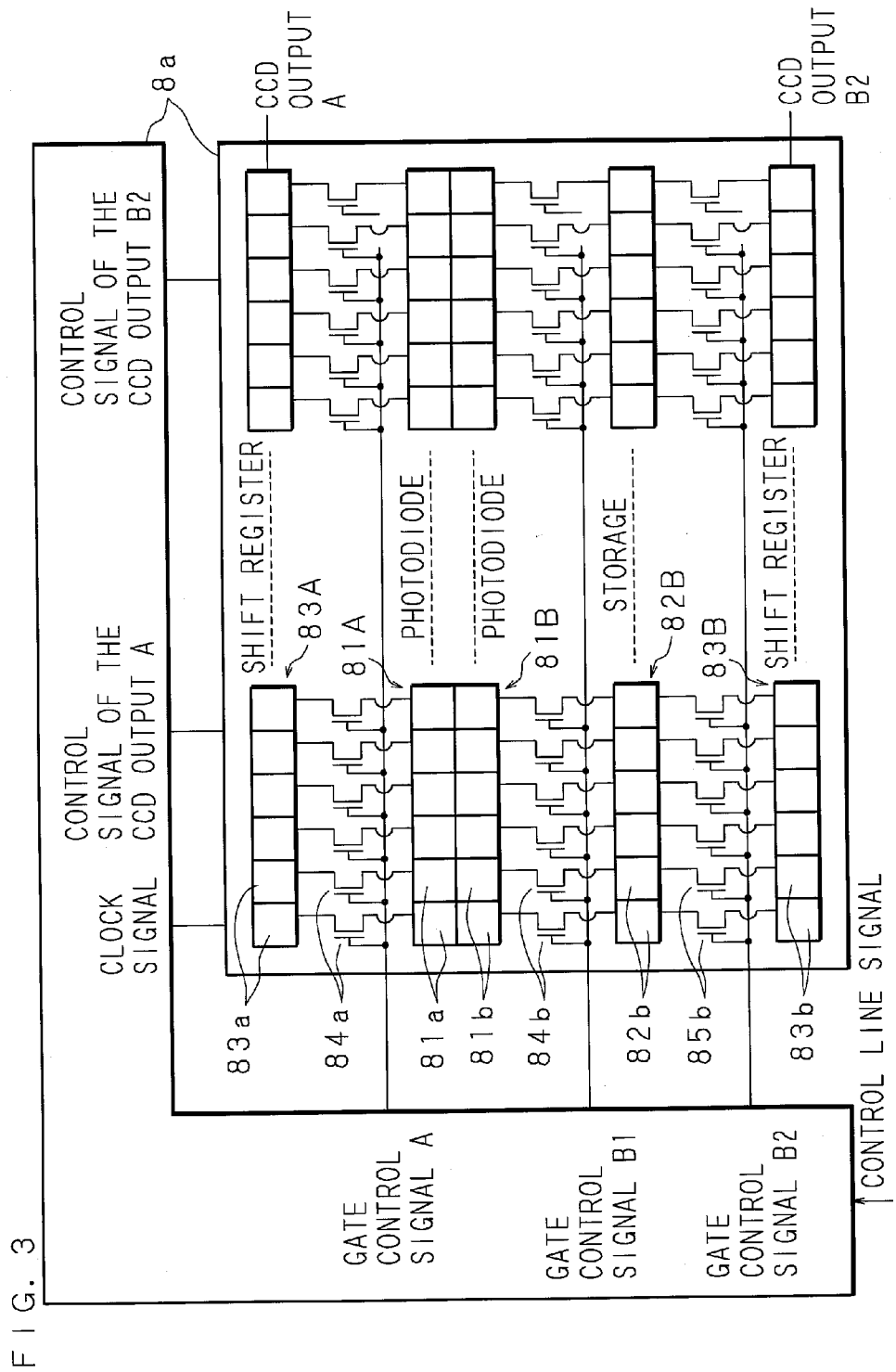
FIG. 3 is a diagram showing a configuration of CCD pairs provided for each color of RGB.

FIG. 3 is a diagram showing a configuration of the CCD pair 8a provided for each color of RGB. One of the CCD pairs 8a includes a photodiode array 81A, a shift register 83A, and shift gates 84a, while the other CCD includes a photodiode array 81B, a storage array 82B, a shift register 83B, the shift gates 84a, and shift gates 85b.

The photodiode array 81A includes photodiodes 81a, and the shift register 83A includes registers 83a. Each of the photodiodes 81a is serially connected with a shift gate 84a and a register 83a in this order from the photodiode 81a. Similarly, the photodiode array 81B, the storage array 82B, and the shift register 83B include photodiodes 81b, storages 82b, and registers 83b, respectively. Each of the photodiodes 81b is serially connected with a shift gate 84b, a storage 82b, a shift gate 85b, and a register 83b in this order from the photodiode 81b.

Further, the two photodiode arrays 81A and 81B include photodiodes 81a and 81b, respectively, each of which are linearly arranged. Each of the photodiode arrays 81A and 81B scans a linear area having a predetermined thickness in the conveying direction of the paper, and accumulates electric charges corresponding to the illuminated light quantity as a scanned signal. Each of the shift gates 84a transmits the electric charges accumulated in the respective photodiode 81a to the respective corresponding register 83a. Here, a time during which the electric charges accumulated in the respective photodiode 81a are transmitted to the respective register 83a may be regarded as a delay time for the register 83a. The registers 83a are serially connected with each other to form the shift register 83A. The electric charges transmitted to each of the registers 83a are sequentially shifted within the shift register 83A, and are serially outputted to the outside of the CCD pair 8a as the CCD output A within a single main scan time.

Each of the shift gates 84b and 85b transmits the electric charges accumulated in the photodiode 81b or transmitted to the storage 82b, respectively, to the storage 82b and the register 83b, respectively. Here, a time during which the electric charges accumulated in the respective photodiode 81b are transmitted to the respective storage 82b and a time during which the electric charges transmitted to the respective storage 82b are transmitted to the respective register 83b may be regarded as a delay time for the respective storage 82b and the respective register 83b. The registers 83b are serially connected with each other to form the shift register 83B. The electric charges transmitted to each of the registers 83b are sequentially shifted within the shift register 83B, and serially outputted to the outside of the CCD pair 8a as the CCD output B2 within a single main scan time.

The control line signals name generically signals which are outputted to the CCD pairs 8a for each color from the control unit 11. The control line signals include the gate control signals A, B1 and B2, a clock signal, and the control signals of the CCD output A and the CCD output B2. The gate control signals A, B1, and B2 are signals to turn ON/OFF the shift gates 84a, 84b, and 85b, respectively. Further, the control signals of the CCD output A and the CCD output B2 are signals to turn ON/OFF the CCD output A and the CCD output B2, respectively.

The ON/OFF operation of the gate control signals A, B1, and B2, as well as the CCD output A and the CCD output B2 are performed synchronizing with the clock. The shift operation of each of the shift registers 83A and 83B is also performed synchronizing with the clock. The CCD output A and the CCD output B2 causes electric charges transmitted to the respective shift register 83A and the respective shift register 83B for a period during which the control signals of the CCD output A and the CCD output B2 are ON, respectively, to output to the outside of the CCD pair 8a, synchronizing with the clock.

Figures 4A, 4B:
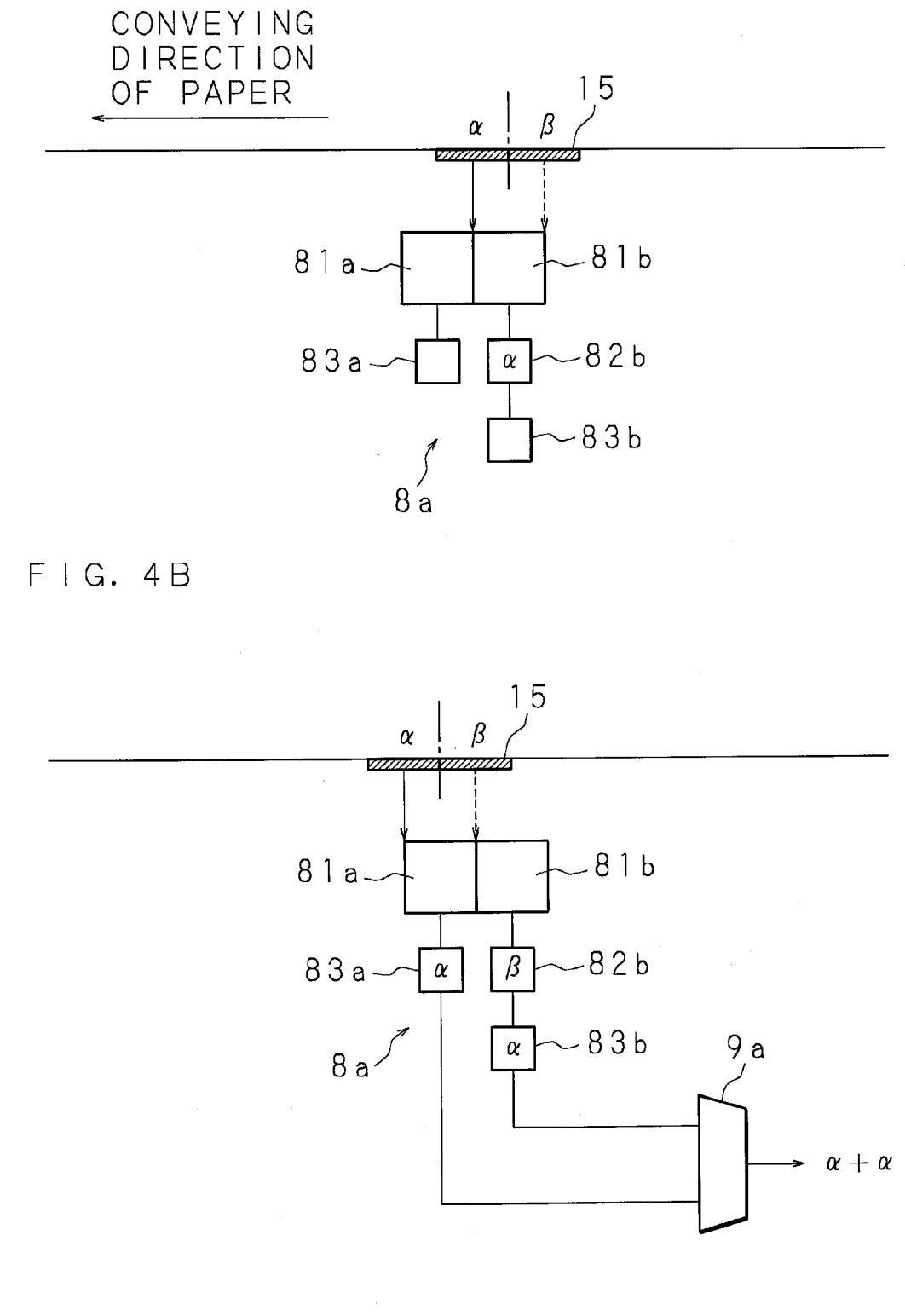

FIG. 4A and FIG. 4B are diagrams showing operations to combine (superimpose) the outputs of two CCDs with TDI scheme by superimposing them. Here, for the photodiodes 81a and 81b, the registers 83a and 83b, and the storage 82b constituting the photodiode arrays 81A and 81B, the shift registers 83A and 83B, the storage array 82B, respectively, the respective connections and operations including the adder 9a will be explained. In this embodiment, in the case of a high resolution, the electric charges to be the scanned signal according to the operations shown in FIG. 4A and FIG. 4B are doubled.

The register 83a that operates as a delay unit is connected to the photodiode 81a. On the other hand, the storage 82b and the register 83b that also operate as delay units are serially connected to the photodiode 81b. Therefore, in the other words, a delay unit of a greater delay time is connected to photodiode 81b located forward of the paper 15 in the relative moving direction between the paper and photodiodes (that is, an opposite direction to the conveying direction of the paper 15), than a delay unit connected to the photodiode 81a located rearward. In fact, the outputs of the registers 83a and 83b are shifted by the shift registers 83A and 83B, respectively, and then they are inputted into the adder 9a as the CCD output A and the CCD output B, respectively. However, the outputs of the registers 83a and 83b are schematically illustrated as being inputted into the adder 9a herein.

The paper 15 is kept conveyed also during the photodiodes 81a and 81b are scanning the paper 15. Thus, in fact, each of the linear area to be scanned is not uniformly scanned by the photodiode arrays 81A and 81B, and is not converted into the electric charges. Instead, the central portion of each linear area in the sub-scanning direction becomes greater in time to be scanned, and thereby the area is more converted into the electric charges rather than boundary portions of the linear area. Further, the photodiode arrays 81A and 81B are closely arranged so that their scanning areas in the linear areas mutually overlap during the sub-scan. In FIG. 4A and FIG. 4B, an area mainly including the central portion of the linear area will be explained as being scanned by the photodiodes 81a and 81b within a single main scan time.

In FIG. 4A, the photodiode 81b scans the central portion of the linear area located forward of the paper 15 in the conveying direction ("α" in the figure), and when the scan is finished, the scanned light is photoelectrically converted, and the converted signal is transmitted to the storage 82b.

All the photodiodes 81a and 81b arranged in the scanning direction parallely perform the scanning and the photoelectric conversion of the single linear area of the paper 15. Further, the single main scan time is set to a value of the isolation distance between the photodiode arrays 81A and 81B divided by a conveying speed of the paper 15. The paper 15 is conveyed by a distance equivalent to the interval of the linear areas during the single main scan time.

During the single main scan time, in FIG. 4B, the photodiode 81a scans the central portion of the linear area located forward of the paper 15 in the conveying direction ("α" in the figure). After that, the scanned light is photoelectrically converted, and the converted scanned signal is transmitted to the register 83a. In addition, the scanned signals stored for a single main scan time in the storage 82b (corresponding to "α" in the figure) is transmitted to the register 83b. Therefore, the adder 9a superimposedly adding the scanned signals corresponding to the linear area located forward of the paper 15 in the conveying direction ("α" in the figure), and thereby outputting a doubled scanned signal.

In this case, the scanned signals that are photoelectrically converted from the scanned central portion of the linear area located rearward of the paper 15 in the conveying direction ("β" in the figure) are transmitted to the storage 82b. However, they will not be added to other signals by the adder 9a in the single main scan time.

Figure 5A:
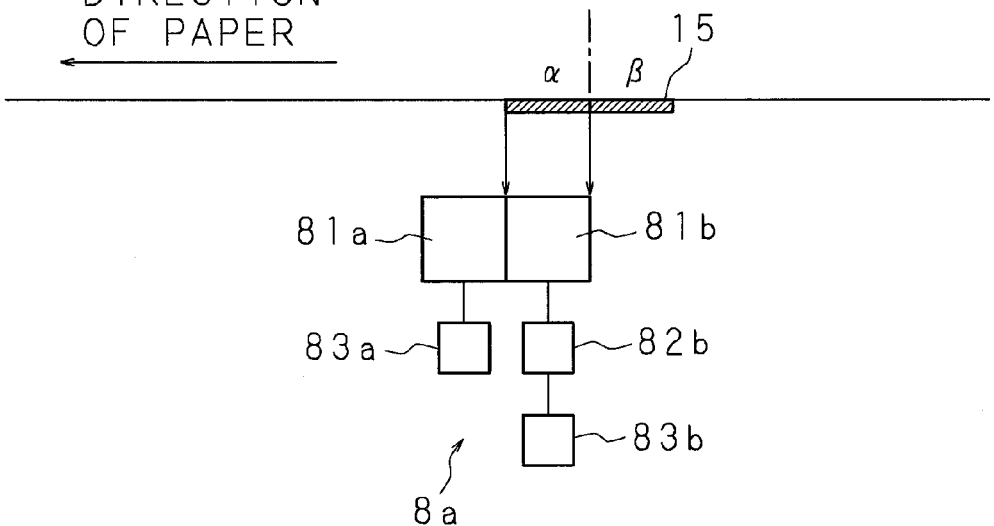
FIGS. 5A and 5B are diagrams showing an operation in which outputs of two CCDs are superimposed when a ½ resolution of a high resolution is specified.
Figure 5B:
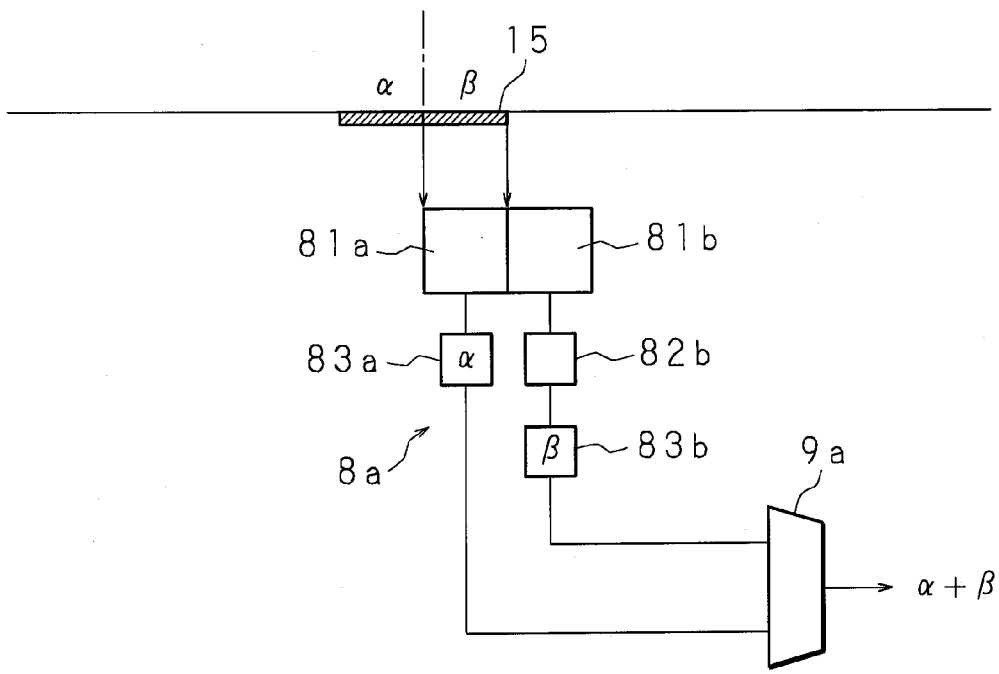

FIG. 5A and FIG. 5B are diagrams showing an operation in which outputs of two CCDs are superimposed when a ½ resolution of a high resolution is specified. The control unit 11 doubles a conveying speed of the paper 15 of a high resolution via a motor drive circuit 14, when an instruction of a resolution corresponding to ½ of the high resolution (switch "close") is received from a resolution switch 12a. Here, the connection of the photodiodes 81a and 81b, the storage 82b, and the registers 83a and 83b is similar to that of FIG. 4A and FIG. 4B.

In FIG. 5A and FIG. 5B, a conveying speed of the paper 15 is twice faster than that of FIG. 4A and FIG. 4B. On the other hand, an operation where the photodiodes 81a and 81b scans the paper 15 for a single main scan time is the same as that of FIG. 4A and FIG. 4B. Thus, a dimension of the paper 15 in the conveying direction scanned per the single main scan time is doubled of the case of FIG. 4. Therefore, in FIG. 5A and FIG. 5B, we emphasize on the area having a dimension from a front edge portion to a rear edge portion of the single linear area, and explain as that the area is scanned within a single main scan time.

In FIG. 5A, the photodiodes 81a and 81b are shown as being about to start scanning of each front edge portion of linear areas located forward and rearward of the paper 15, respectively ("α" and "β" in the figure, respectively). Therefore, after the single main scan time from the state of FIG. 5A, as shown in FIG. 5B, the photodiodes 81a and 81b finished the scanning of each rear edge portion for the linear area located forward and rearward of the paper 15 ("α" and "β" in the figure, respectively), and the scanned signals photoelectrically converted from the scanned lights are transmitted to the register 83b and the storage 82b, respectively. Here, the scanned signals transmitted to the storage 82b are configured to be immediately transmitted to the register 83b. Thus, the adder 9a superimposedly adds the scanned signals corresponding to the linear area located forward and rearward of the paper 15 in the conveying direction ("α" and "β" in the figure), and thereby outputting a doubled scanned signal.

FIG. 6 is a timing chart showing a relationship between the gate control signals and the CCD output control signals outputted by the control unit 11 with TDI scheme. When an instruction of a high resolution (switch "open") and an instruction of a scanning start are received from the resolution switch 12a and the start switch 12b, respectively, the control unit 11 starts conveyance of the paper 15 via the motor drive circuit 14, so that it is controlled about relative movement between photodiodes and the paper. At the same time, scanning the paper 15 is performed, and then control signals are outputted in accordance with FIG. 6. In FIG. 6, the horizontal axis indicates time, and on the vertical axes, (a), (b), (c), (d), and (e) indicates the gate control signal A, the CCD output A control signal, the gate control signal B1, the gate control signal B2, and the CCD output B2 control signal in this order from the top. Time periods T1, T2, and T3 show a single main scan time.

In (a) of FIG. 6, it is shown about a pulse waveform of the gate control signal A for controlling ON/OFF of the shift gate 84a. While the control unit 11 turns OFF the gate control signal A, the photodiode 81a is separated from the register 83a and accumulates electric charges in accordance with the light quantity of the scanned light from the paper 15. When the control unit 11 turns ON the gate control signal A at the beginning of the next single main scan time, the shift gate 84a is opened and the electric charges are transmitted to the register 83a. Thus, the electric charges transmitted to the register 83a at the beginning of each of the main scan time periods T2 and T3 are electric charges accumulated in the photodiode 81a within each of the single main scan time periods T1 and T2, respectively. Here, the following explanations are based on an assumption that the photodiode 81a scans a linear area located forward of the paper 15 in the conveying direction ("α" of FIG. 4A and FIG. 4B) within the single main scan time period T2, and the electric charges accumulated in the photodiode 81a within the time concerned are transmitted to the register 83a at the beginning of the single main scan time period T3.

In (b) of FIG. 6, it is shown about the CCD output A control signal for controlling ON/OFF of the CCD output A. When the control unit 11 turns OFF the gate control signal A, and then turns ON the CCD output A control signal, the electric charges accumulated in the shift register 83A are serially outputted synchronizing with clock by the CCD output A. Therefore, the accumulated electric charges caused by the photodiode 81a scanning the linear area located forward of the paper 15 in the conveying direction ("α" of FIG. 4A and FIG. 4B) are outputted from the CCD output A within the single main scan time period T3.

In (c) of FIG. 6, it is shown about a pulse waveform of the gate control signal B1 for controlling ON/OFF of the shift gate 84b. While the control unit 11 turns OFF the gate control signal A, the photodiode 81b accumulates electric charges in accordance with the light quantity of the scanned light from the paper 15. When the control unit 11 turns ON the gate control signal B1 at the beginning of the next single main scan time, the shift gate 84b is opened and the electric charges are transmitted to the storage 82b. The photodiode 81b is arranged so that it scans a location one line rearward of the paper 15 in the conveying direction from the photodiode 81a. Thus, the photodiode 81b scans the linear area located forward of the paper 15 in the conveying direction ("α" of FIG. 4A and FIG. 4B) earlier than the photodiode 81a by a conveyance time of the single linear area of the paper 15 (that is, a single main scan time). Therefore, the photodiode 81b scans the linear area located forward of the paper 15 in the conveying direction ("α" of FIG. 4A and FIG. 4B) within the single main scan time period T1. Further, the electric charges accumulated in the photodiode 81a within the time concerned are transmitted to the storage 82b at the beginning of the single main scan time period T2.

In (d) of FIG. 6, it is shown about a pulse waveform of the gate control signal B2 for controlling ON/OFF of the shift gate 84b. Within each main scan time, when the electric charges accumulated in the shift register 83B are serially outputted from the CCD output B2 (refer to (e) of FIG. 6), the control unit 11 turns ON the gate control signal B2. Therefore, the scanning outputs of the electric charges accumulated in storages 82b are finished for a single linear area of the CCD output B2, and the electric charges are then transmitted to the register 83b by the time when the next single main scan time starts. In addition, the electric charges transmitted to the storage 82b at the beginning of the single main scan time period T2 are transmitted to the register 83b by the time when the single main scan time period T3 starts.

In other words, the storages 82b operates to transmit the electric charges accumulated in the photodiode 81b to the register 83b with delay of a single main scan time.

In (e) of FIG. 6, it is shown about the CCD output B2 control signal for controlling ON/OFF of CCD output B2. When the control unit 11 turns ON the CCD output B2 control signal, the electric charges accumulated in the shift register 83B are serially outputted from the CCD output B2 synchronizing with clock. Thus, the accumulated electric charges by the photodiode 81b scanning the front side of the paper 15 in the conveying direction ("α" of FIG. 4A and FIG. 4B) are outputted from the CCD output B2 within the single main scan time period T3, and are then inputted to the adder 9a to be added to the electric charges outputted from the CCD output A.

FIG. 7 is a timing chart showing a relationship between the gate control signals and the CCD output control signals outputted from the control unit 11, when a ½ resolution of the high resolution is specified. When an instruction (switch "close") of a resolution corresponding to ½ of the high resolution and an instruction of a scanning start are received from the resolution switch 12a and the start switch 12b, respectively, the control unit 11 starts conveyance of the paper 15 via the motor drive circuit 14, so that it is controlled about relative movement between photodiodes and the paper. At the same time, scanning the paper 15 is performed, and then each control signal is outputted in accordance with FIG. 7.

The signals corresponding to (a), (b), (c), (d), and (e) of FIG. 7 are the same as the signals corresponding to (a), (b), (c), (d), and (e) of FIG. 6, respectively, and only some of the signals differ in output timing. Because the gate control signal A corresponding to (a) of FIG. 7, the CCD output A control signal corresponding to (b) of FIG. 7, and the gate control signal B1 corresponding to (c) of FIG. 7 are outputted in the same timing as the signals corresponding to (a), (b), and (c) of FIG. 6, respectively, explanations of their common portions will be omitted herein.

In (a) of FIG. 7, it is shown about a pulse waveform of the gate control signal A for controlling ON/OFF of the shift gate 84a. Further, in (b) of FIG. 7, it is shown about the CCD output A control signal for controlling ON/OFF of the CCD output A. As described above, the accumulated electric charges by the photodiode 81a scanning the linear area located on the front side of the paper 15 in the conveying direction ("α" of FIG. 5A and FIG. 5B) are outputted from the CCD output A within the single main scan time period T3.

The dimension of the paper 15 in the conveying direction that is scanned at this point is doubled compared with the case of the high resolution of FIG. 6, as described above. However, here, the following explanations are based on the assumption in which an area having a dimension from a front edge portion to a rear edge portion of a single linear area of the high resolution is scanned within a single main scan time, focusing attention on this area.

In (c) of FIG. 7, it is shown about a pulse waveform of the gate control signal B1 for controlling ON/OFF of the shift gate 84b. While the control unit 11 turns OFF the gate control signal A, the photodiode 81b accumulates electric charges in accordance with the light quantity of the scanned light from the paper 15. The photodiode 81b is arranged so that it scans a single linear area behind on the paper 15 in the conveying direction with respect to that of the photodiode 81a. Thus, within the single main scan time period T2 during which the photodiode 81a scans the linear area located at the front side of the paper 15 in the conveying direction ("α" of FIG. 5A and FIG. 5B) in (a) of FIG. 7 or in (a) of FIG. 6, the photodiode 81b scans the linear area located on the rear side of the paper 15 in the conveying direction ("β" of FIG. 5A and FIG. 5B), and accumulates electric charges.

At the beginning of the single main scan time period T3 following T2, the control unit 11 turns ON the gate control signal B1, and then transmits the electric charges accumulated in the photodiode 81b to the storage 82b.

In (d) of FIG. 7, it is shown about a pulse waveform of the gate control signal B2 for controlling ON/OFF of the shift gate 84b. Immediately after the control unit 11 turned OFF the gate control signal A, and before it turns ON the CCD output B2 control signal (refer to (e) of FIG. 7), the control unit 11 turns ON the gate control signal B2, and then transmits the electric charges transmitted to the storage 82b to the register 83b. Thus, the storages 82b operates so that it transmits the electric charges accumulated in the photodiode 81b to the register 83b without delay of a single main scan time.

In (e) of FIG. 7, it is shown about the CCD output B2 control signal for controlling ON/OFF of the CCD output B2. When the control unit 11 turns ON the CCD output B2 control signal, the electric charges accumulated in the shift register 83B are serially outputted from the CCD output B2 synchronizing with clock. Therefore, the accumulated electric charges by photodiode 81b scanning the linear area located on the rear side of the paper 15 in the conveying direction ("β" of FIG. 5A and FIG. 5B) are outputted from the CCD output B2 within the single main scan time period T3, and are then inputted into the adder 9a to be added to the electric charges outputted from the CCD output A.

In this case, the quantity of the electric charges outputted from the CCD output A or the CCD output B2 are not essentially different from the case of TDI scheme. Therefore, the scanned signals of the paper 15 to be outputted from the adder 9a within the single main scan time period T3 have a scanning quality that is approximately the same as the case of the high resolution according to TDI scheme. Thus, there is no degradation by making the conveying speed of the paper 15 doubled of the case of the high resolution.

As described above, according to this embodiment, CCDs, each of which having two rows of photodiode arrays, are parallely arranged in the conveying direction of a paper. In the case that an instruction of low resolution is received from an operating unit, when electric charges accumulated in a row of the two rows of photodiode arrays is transmitted to an adder, each storage of a storage array is configured to apply no delay. Thus, in the case of an instruction of low resolution, the electric charges accumulated in the two rows of photodiode arrays are added to each other without a time lag therebetween, per a corresponding photodiode pair between the arrays. Therefore, the electric charges used as the scanned signals are doubled, and deterioration of the scanning quality of the paper can be prevented.

Further, the photodiode array that scans a front side of the paper in the conveying direction is connected with a shift register, and the photodiode array that scans a rear side of the paper is connected with a storage array and a shift register. A sum of the delay times by each storage according to a respective storage array and by each register according to a respective shift register equals to or is greater than the delay time by each register of the shift register. Then, the electric charges accumulated by the photodiode arrays may also be added to each other with a time lag or without a time lag for each photodiode.

In addition, when the electric charges accumulated by the photodiode array are transmitted to the adder, each register of the shift register adds a fixed delay time for each photodiode. Each storage of the storage array adds a delay time corresponding to a single main scan time for each photodiode when transmitting the electric charges. In this case, when an instruction of low resolution is received from the operating unit, only the fixed delay time by the shift register is added without the delay time by the storage array. Therefore, the electric charges accumulated in the photodiode arrays may be added to each other with TDI scheme for each photodiode, and may also be added without a time lag.

Further, when an instruction of low resolution is received from the operating unit, a conveying speed of the paper is increased more than the case where an instruction of high resolution is received. Therefore, in a low scanning resolution, the scan time of the paper can be shortened.

Further, corresponding to each color of RGB, two rows of photodiode arrays are provided. Therefore, a color image can be scanned.

In the above embodiment, two rows of photodiode arrays are provided corresponding to the colors of RGB. However, it is not limited to this, and three or more rows of photodiode arrays may be provide. In this case, to each photodiode of each of the photodiode arrays, a register, and an incremented number of storages (incremented by one between adjacent photodiodes) may be serially connected. In addition, at the time of low resolution, it may be controlled so as to have no delay in the storage arrays.

Further, the instruction of resolution received by the operating unit is not limited to two levels of high resolution and low resolution, and an instruction of 1/K (K is a natural number of three or more) of the highest resolution. In this case, if a speed of main scan is increased by K times of that of the highest resolution, the resolution in the conveying direction of the paper only decreases by 1/K times, and thereby the scanning quality of the scanned signals outputted from the adder is maintained.

As this invention may be embodied in several forms without departing from the spirit of essential characteristics thereof, the present embodiments are therefore illustrative and not restrictive, since the scope of the invention is defined by the appended claims rather than by the description preceding them and all changes that fall within metes and bounds of the claims, or equivalence of such metes and bounds thereof are therefore intended to be embraced by the claims.

What is claimed is:

1. An image scanning device comprising:
a plurality of photoelectric converters coplanarly arranged in parallel with each other, each of the photoelectric converters having photoelectric conversion elements that are linearly arranged for scanning an image on an original;
a relative movement control part which controls relative movement between the photoelectric conversion elements and the original in the parallely-arranged direction of the plurality of photoelectric converters;
a combine unit which superimposes conversion results of the plurality of photoelectric converters, wherein the conversion results are based on data obtained by the plurality of photoelectric converters scanning at substantially the same time; and
a receive unit which receives a predetermined instruction;
wherein the combine unit superimposes the conversion results of the plurality of photoelectric converters with a time lag while the relative movement control part performs the relative movement with a predetermined speed, when the receive unit does not receive the predetermined instruction representing a scan with a resolution lower than the highest resolution, and the combine unit superimposes the conversion results of the plurality of photoelectric converters without the time lag while the relative movement control part increases a speed of the relative movement to become not less than a predetermined number of times, when the receive unit receives the predetermined instruction representing a scan with a resolution lower than the highest resolution, the predetermined number is equal to a number of the plurality of photoelectric converters, and the speed with the resolution lower than the highest resolution is more than the speed with the highest resolution.

2. The image scanning device according to claim 1, further comprising:
a plurality of delay units corresponding to the plurality of photoelectric converters,
wherein each of the delay units corresponds to each of the photoelectric converters, and
a delay time for one of the plurality of delay units is longer than a delay time for the other delay unit with photoelectric converters located more rearward in the relative moving direction with respect to the original than photoelectric converter of said one of the plurality of delay units.

3. The image scanning device according to claim 2, wherein the plurality of delay units include serially-connected first to Mth delay units, each of which including a fixed delay unit having a predetermined delay time, and N (N is an integer from 0 to M-1) variable delay units having a delay time that corresponds to a time period during which the original is relatively moved from a photoelectric converter to an adjacent photoelectric converter; and
the combine unit sets a delay time for the first to Mth delay units to the predetermined delay time when the receive unit receives the predetermined instruction.

4. The image scanning device according to claim 3, wherein the receive unit receives the predetermined instruction that is related to scanning at a 1/J (J is a natural number greater than two) resolution of the highest resolution; and
the relative movement control part increases the speed of relative movement by J times of that of the highest resolution when the receive unit receives the predetermined instruction.

5. The image scanning device according to claim 4, wherein the plurality of photoelectric converters correspond to colors of RGB, respectively.

6. The image scanning device according to claim 3, wherein the plurality of photoelectric converters correspond to colors of RGB, respectively.

7. The image scanning device according to claim 2, wherein the receive unit receives the predetermined instruction that is related to scanning at a 1/J (J is a natural number greater than two) resolution of the highest resolution; and
the relative movement control part increases a speed of the relative movement by J times of that of the highest resolution when the receive unit receives the predetermined instruction.

8. The image scanning device according to claim 7, wherein the plurality of photoelectric converters correspond to colors of RGB, respectively.

9. The image scanning device according to claim 2, wherein the plurality of photoelectric converters correspond to colors of RGB, respectively.

10. The image scanning device according to claim 1, wherein the receive unit receives the predetermined instruction that is related to scanning at a 1/J (J is a natural number greater than two) resolution of the highest resolution; and
the relative movement control part increases a speed of the relative movement by J times of that of the highest resolution when the receive unit receives the predetermined instruction.

11. The image scanning device according to claim 10, wherein the plurality of photoelectric converters correspond to colors of RGB, respectively.

12. The image scanning device according to claim 1, wherein the plurality of photoelectric converters correspond to colors of RGB, respectively.

13. The image scanning device comprising:
a plurality of photoelectric converters coplanarly arranged in parallel with each other, each of the photoelectric converters having photoelectric conversion elements that are linearly arranged for scanning an image on an original;
a relative movement control means for controlling relatively movement between the photoelectric conversion elements and the original in the parallely-arranged direction of the plurality of photoelectric converters;
a combine means for superimposing conversion results of the plurality of photoelectric converters, wherein the conversion results are based on data obtained by the plurality of photoelectric converters scanning at substantially the same time; and
a receive means for receiving a predetermined instruction;
wherein the combine unit superimposes the conversion results of the plurality of photoelectric converters with a time lag while the relative movement control part performs the relative movement with a predetermined speed, when the receive unit does not receive the predetermined instruction representing a scan with a resolution lower than the highest resolution, and the combine unit superimposes the conversion results of the plurality of photoelectric converters without a time lag, respectively, while the relative movement control part increases a speed of the relative movement to become not less than a predetermined number of times, when the receive unit receives the predetermined instruction representing a scan with a resolution lower than the highest resolution,
the predetermined number is equal to a number of the plurality of photoelectric converters, and
the speed with the resolution lower than the highest resolution is more than the speed with the highest resolution.

* * * * *